(12) United States Patent
Geliot et al.

(10) Patent No.: US 12,508,454 B2
(45) Date of Patent: Dec. 30, 2025

(54) AIRCRAFT PYLON EQUIPPED WITH A GUIDANCE SYSTEM FOR MOUNTING OR DISMOUNTING A TANK AND METHOD OF MOUNTING/DISMOUNTING SAID TANK

(71) Applicant: Airbus Operations SAS, Toulouse (FR)

(72) Inventors: Jean Geliot, Toulouse (FR); Adeline Soulie, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 320 days.

(21) Appl. No.: 18/461,808

(22) Filed: Sep. 6, 2023

(65) Prior Publication Data
US 2024/0082611 A1    Mar. 14, 2024

(30) Foreign Application Priority Data
Sep. 9, 2022  (FR) .................................. 2209081

(51) Int. Cl.
*A62C 3/08* (2006.01)
*A62C 35/02* (2006.01)

(52) U.S. Cl.
CPC .............. *A62C 3/08* (2013.01); *A62C 35/02* (2013.01)

(58) Field of Classification Search
CPC ................................. A62C 3/08; A62C 35/02
USPC ................................ 169/51, 53, 62; 239/171
See application file for complete search history.

(56) References Cited

U.S. PATENT DOCUMENTS

| 8,800,675 B2 | 8/2014 | Machado et al. |
| 2017/0096238 A1 | 4/2017 | Porte et al. |
| 2021/0101694 A1 | 4/2021 | Cayssials et al. |
| 2021/0188457 A1* | 6/2021 | Cayssials ................. F02C 7/25 |
| 2022/0274684 A1* | 9/2022 | Tulloch ............... B64D 27/357 |
| 2023/0000697 A1 | 1/2023 | Geliot et al. |

FOREIGN PATENT DOCUMENTS

DE      102012203740 B3    7/2013

OTHER PUBLICATIONS

French Search Report for corresponding French Patent Application No. 2209081 dated Mar. 24, 2023; priority document.

* cited by examiner

*Primary Examiner* — Steven J Ganey
(74) *Attorney, Agent, or Firm* — Greer, Burns & Crain, Ltd.

(57) ABSTRACT

An aircraft pylon comprising a box-section primary structure and at least one tank positioned inside the primary structure. To facilitate mounting or demounting the tank, the pylon is equipped with a guide system configured to move the tank from its mounted position toward a through-hole, including a guide rail fastened to the primary structure and positioned above the tank and a guide pin fastened to the tank cooperating with the guide rail so that the tank is supported by the guide rail and is able to slide along the latter. This guide system contributes to simplifying manipulation of the tank when mounting or demounting the tank by at least partly compensating its weight and guiding the tank.

16 Claims, 5 Drawing Sheets

AIRCRAFT PYLON EQUIPPED WITH A GUIDANCE SYSTEM FOR MOUNTING OR DISMOUNTING A TANK AND METHOD OF MOUNTING/DISMOUNTING SAID TANK

CROSS-REFERENCES TO RELATED APPLICATIONS

This application claims the benefit of the French patent application No. 2209081 filed on Sep. 9, 2022, the entire disclosures of which are incorporated herein by way of reference.

FIELD OF THE INVENTION

The present invention relates to an aircraft pylon equipped with a guide system for mounting or demounting a tank and a method of mounting/demounting said tank.

BACKGROUND OF THE INVENTION

In one embodiment an aircraft comprises pylons connecting the propulsion assemblies to the wings. Each of them comprises a box section primary structure in which is positioned at least one tank containing a fire-extinguishing agent. The primary structure comprises lateral walls with holes through them enabling introduction of each tank into the interior of the primary structure. In the mounted state the tanks are connected to the primary structure in a position offset relative to the through-holes. The volume and the weight of each tank depending on the fire-extinguishing fluid used and contained in the reservoir, for a first type of fluid the tank has a weight and a volume enabling it to be easily manipulated by an operative when mounting it in the primary structure or demounting it. For other types of fluids, the tank has a weight and a volume such that it becomes difficult for an operative to manipulate it.

The present invention aims to remedy some or all of the disadvantages of the prior art.

SUMMARY OF THE INVENTION

To this end the invention has for an object an aircraft pylon comprising:
- a box-section primary structure including at least one lateral wall which delimits an interior zone and an exterior zone and includes at least one through-hole enabling the interior and exterior zones to communicate,
- at least one tank occupying in the interior zone of the primary structure a mounted position offset in a longitudinal direction relative to the through-hole,
- at least one attachment system demountably connecting the tank and the primary structure.

In accordance with the invention the aircraft pylon is equipped at least when mounting or demounting the tank with at least one guide system configured to move the tank from its mounted position toward the through-hole, said guide system including at least one guide pin fastened to the tank, one guide rail positioned above the tank that extends between first and second ends, and a connecting system connecting the guide rail and the primary structure, the guide pin and the guide rail being configured to cooperate with each other so that the tank is supported by the guide rail and able to slide along the guide rail.

The guide system contributes to simplifying manipulation of the tank when mounting or demounting it by at least partly compensating its weight and assuring precise guiding of the tank during its transfer in the direction of the through-hole.

In one arrangement the guide rail extends in a longitudinal direction.

In accordance with another feature, the first end of the guide rail being situated in the vicinity of or in line with the through-hole, the connecting system is configured to allow at least the second end of the guide rail to be moved in a vertical direction.

In accordance with another feature the connecting system comprises:
- a pivoting first connection situated in the vicinity of the first end of the guide rail, connecting the latter to the primary structure and including a horizontal pivot pin perpendicular to the longitudinal direction,
- an elastically deformable second connection offset toward the second end of the guide rail relative to its first end and connecting the guide rail and the primary structure.

In accordance with another feature, the second connection comprises a leaf spring that has a first end connected to the guide rail and a second end offset in the longitudinal direction relative to the first end and connected to the primary structure.

In accordance with another feature, the first end of the leaf spring is oriented toward the first end of the guide rail and the second end of the leaf spring is oriented toward the second end of the guide rail, the first end of the leaf spring being closer to the first end of the guide rail than its second end.

In accordance with another feature, the first end of the leaf spring is pressed against the guide rail and connected to the latter by at least one connecting element. Additionally, the second connection comprises at least one hook fastened to the second end of the leaf spring configured to be hooked onto the primary structure.

In accordance with another feature, the primary structure of the aircraft pylon comprises transverse frames, one of the transverse frames having a core positioned in a transverse plane and a rim projecting relative to the core and oriented in a direction away from the through-hole. Additionally, the hook has a Z-shape profile and comprises a flange oriented in the direction of the through-hole configured to cooperate with the rim of the transverse frame.

In accordance with another feature, the second connection comprises at least one system for keeping the hook hooked onto the transverse frame.

In accordance with another feature, the guide pin has a revolution axis and comprises a head and a foot connecting the head to the tank, the head having a larger section than the foot.

In accordance with another feature, the tank has a revolution axis, the revolution axes of the guide pin and the tank coinciding.

In accordance with another feature, the guide rail comprises:
- a body that has a lower face oriented toward the tank, a first end face situated at the level of the first end of the guide rail and a second end face situated at the level of the second end of the guide rail,
- a groove provided in the body opening onto the lower face of the body that has a T-shape cross section configured to accommodate the guide pin.

In accordance with another feature, the groove opens onto the first and second end faces of the body.

In accordance with another feature, the first end of the guide rail being situated in the vicinity of or in line with the through-hole, the groove has an opening section extending as far as the first end face at the level of which the groove is flared in the direction of the first end face.

The invention also has for an object a method of demounting a tank positioned in an aircraft pylon having any of the above features. This demounting method comprises:
- a step of unfastening the tank from the primary structure of the pylon,
- a step of mounting the guide rail so as to cause the guide pin to cooperate with the guide rail and to connect the guide rail to the primary structure,
- a step of sliding the tank along the guide rail in the direction of the first end of the latter, the tank being suspended from the guide rail,
- a step of unfastening the guide pin and the guide rail,
- a step of manipulating the tank to cause it to pass through the through-hole.

In accordance with another feature, the method comprises a step of lifting and pivoting the tank before the step of sliding the tank along the guide rail.

The invention also has for an object a method of mounting a tank positioned in an aircraft pylon having any of the above features. This mounting method comprises:
- a step of manipulating the tank to cause it to pass through the through-hole so as to position it in the interior zone of the primary structure,
- a step of suspending the tank from the guide rail by causing the guide pin and the guide rail to cooperate,
- a step of sliding the tank along the guide rail in the direction of the second end of the latter,
- a step of positioning the tank relative to the attachment system,
- a step of demounting the guide rail,
- a step of fastening the tank to the primary structure of the pylon.

BRIEF DESCRIPTION OF THE DRAWINGS

Other features and advantages will emerge from the following description of the invention given by way of example only with reference to the appended drawings in which.

DETAILED DESCRIPTION OF THE PREFERRED EMBODIMENTS

Figure 1:
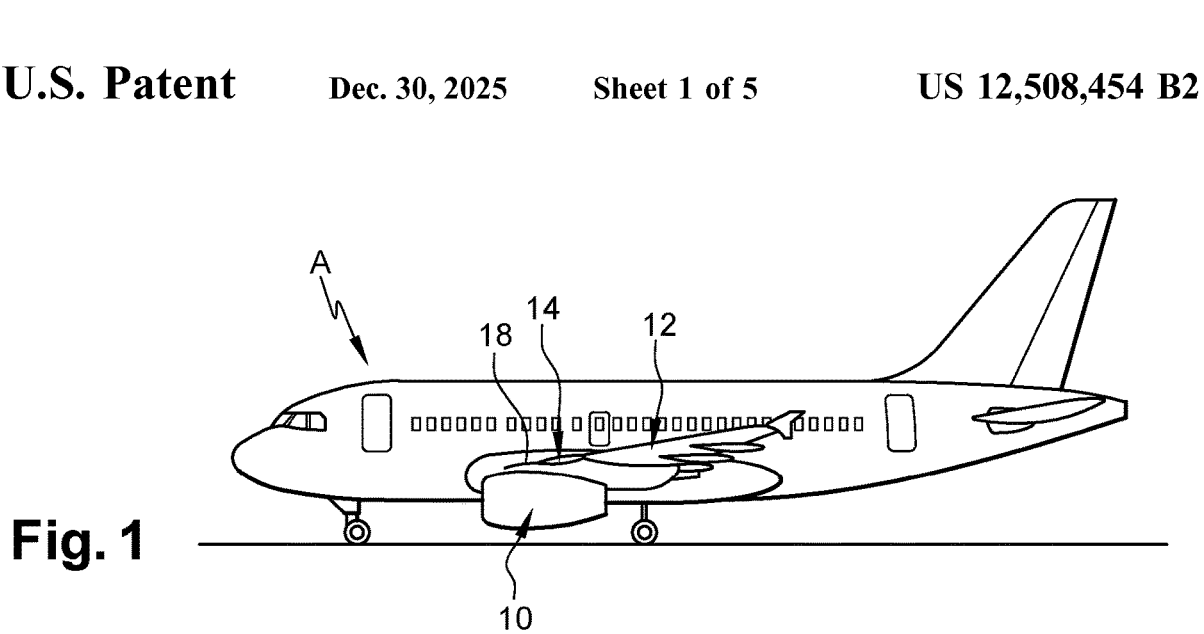
FIG. 1 is a lateral view of an aircraft.

In accordance with an embodiment that can be seen in FIG. 1, an aircraft A comprises a plurality of propulsion assemblies 10 connected to the wings 12 by pylons 14.

Each pylon 14 comprises a primary structure 16 (visible in FIG. 2) that, among other things, transmits forces between the propulsion assembly 10 and the corresponding wing 12 and a secondary structure 18 (visible in FIG. 1) that envelopes the primary structure 16 and limits the drag on the pylon 14.

Figure 2:
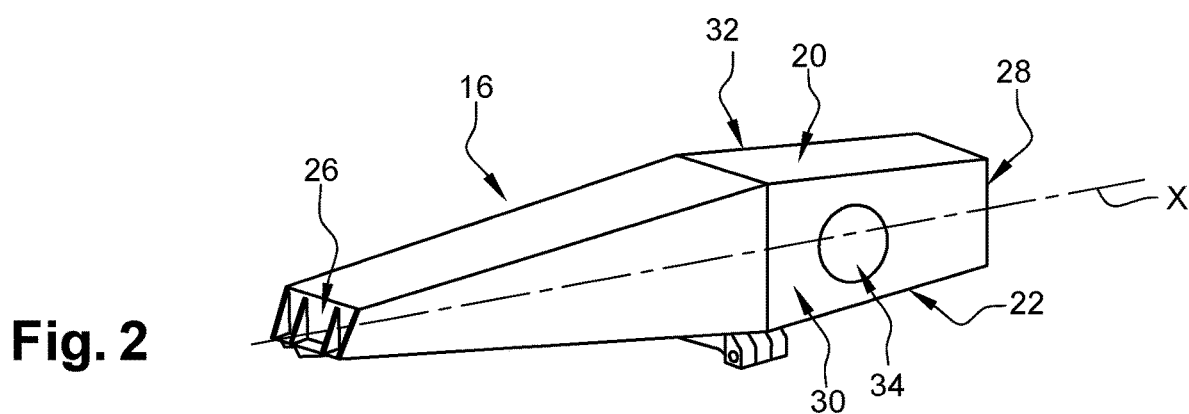
FIG. 2 is a perspective view of a primary structure of an aircraft pylon, depicting one embodiment.
Figure 3:
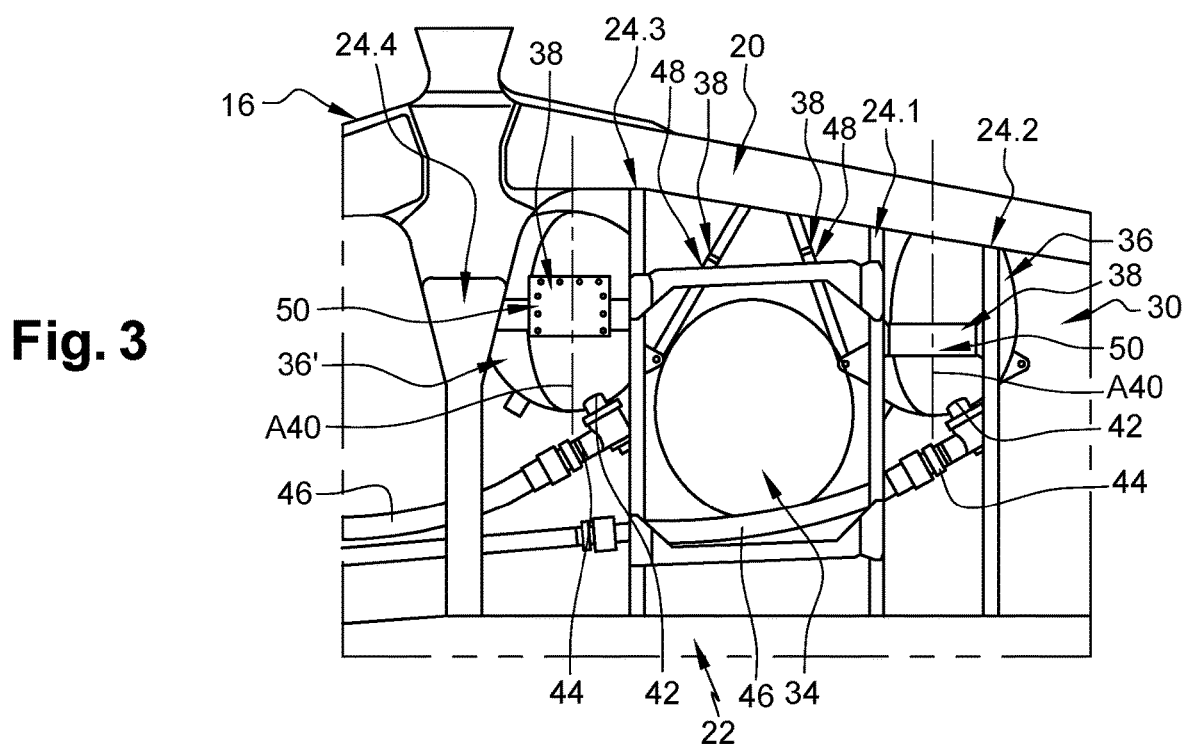
FIG. 3 is a perspective view of the interior of a primary structure of an aircraft pylon and two tanks positioned inside the primary structure, depicting one embodiment of the invention.

In a configuration visible in FIGS. 2 and 3, the primary structure 16 is a box-section structure that comprises:
- an upper longitudinal member 20,
- a lower longitudinal member 22,
- transverse frames 24.1 to 24.4 (visible in FIG. 3) that connect the upper and lower longitudinal members 20, 22, are disposed in transverse planes and each have an approximately square or rectangular contour,
- a front end wall 26 that connects a front end of the upper longitudinal member 20 and a front end of the lower longitudinal member 22,
- a rear end wall 28 that connects a rear end of the upper longitudinal member 20 and a rear end of the lower longitudinal member 22,
- two lateral panels 30, 32 disposed on respective opposite sides of the transverse frames 24.1 to 24.4 and connected to the upper and lower longitudinal members 20, 22.

In the remainder of the description a longitudinal direction is parallel to a substantially horizontal axis X when the aircraft is on the ground and positioned approximately equidistantly from the lateral panels 30, 32. A transverse plane is substantially perpendicular to the axis X. A longitudinal plane is a vertical plane parallel to the axis X.

At least one lateral panel 30, 32 comprises a through-hole 34 enabling communication of the interior of the primary structure 16 with the outside.

In one configuration, the primary structure 16 comprises first and second rear transverse frames 24.1, 24.2 positioned in transverse planes between the center of the through-hole 34 and the rear end wall 28, the second rear transverse frame 24.2 being offset toward the rear end wall 28 relative to the first rear transverse frame 24.1, and first and second front transverse frames 24.3, 24.4 positioned in transverse planes between the center of the through-hole 34 and the front end wall 26, the second front transverse frame 24.4 being offset toward the front end wall 26 relative to the first front transverse frame 24.3. The transverse frames 24.1 to 24.4 may also be referred to as ribs.

Of course, the invention is not limited to this embodiment of the primary structure 16. Regardless of the embodiment, the primary structure 16 comprises at least one lateral wall 32 delimiting an interior zone and an exterior zone and including at least one through-hole enabling the interior and exterior zones to communicate.

The aircraft pylon 14 comprises at least one tank 36 positioned inside the primary structure 16 and one attachment system 38 connecting the tank 36 and the primary structure 16. In one embodiment, each tank 36 is configured to store a fire-extinguishing fluid. Of course, the invention is not limited to this embodiment. Other fluids may be envisaged.

In one configuration, the aircraft pylon 14 comprises a first tank 36 offset toward the rear end wall 28 relative to the through-hole 34 and a second tank 36' offset toward the front end wall 26 relative to the through-hole 34.

Figure 5:
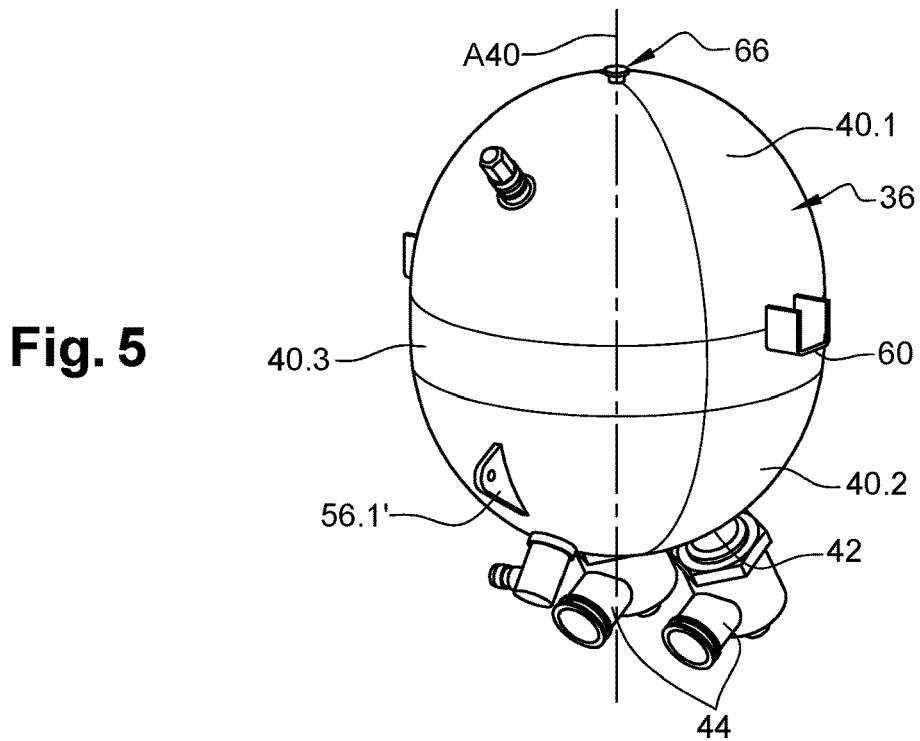
FIG. 5 is a perspective view of a tank, depicting one embodiment of the invention.

In an embodiment that can be seen in FIG. 5, each tank 36 has a spherical or ovoid shape. In one configuration, each tank 36 comprises a hemispherical upper portion 40.1, a hemispherical lower portion 40.2 and a cylindrical intermediate portion 40.3 of circular section connecting the upper and lower portions 40.1, 40.2. In this configuration, the tank 36 has a revolution axis A40 that is substantially vertical when the tank 36 is in the mounted position connected to the primary structure 16. Each tank 36 comprises at least one offtake 42 enabling the interior and the exterior of the tank 36 to communicate. The offtakes 42 may be positioned at the level of any of the upper, lower or intermediate portions 40.1, 40.2, 40.3.

The tank 36 comprises at least one connection system 44 connected to an offtake 42 and configured to connect the tank 36 to at least one pipe 46. In one arrangement the tank 36 comprises two connection systems 44, each connected to a pipe 46, positioned at the level of the lower portion 40.2 of the tank 36.

Of course, the invention is not limited to this embodiment of the tank 36. The latter is sized to obtain the largest possible capacity whilst being housed inside the primary structure 16, the revolution axis A40 being substantially vertical and passing through the through-hole 34, the tank 36 possibly being oriented so that its revolution axis A40 is substantially horizontal.

Regardless of the embodiment, the pylon 14 comprises:
at least one tank 36 occupying a position mounted in the interior zone of the primary structure 16 offset relative to the through-hole 34 in a longitudinal direction,
at least one attachment system 38 demountably connecting the tank 36 and the primary structure 16.

In one embodiment, the attachment system 38 comprises a longitudinal attachment 48 connecting the tank 36 to the primary structure 16, to be more specific to the upper longitudinal member 20, and first and second lateral attachments 50, 52 positioned transversely on respective opposite sides of the tank 36 and each connecting the tank 36 to the primary structure 16, to be more precise to the first and second rear or front transverse frames 24.1, 24.2, 24.3, 24.4, respectively.

Figure 4:
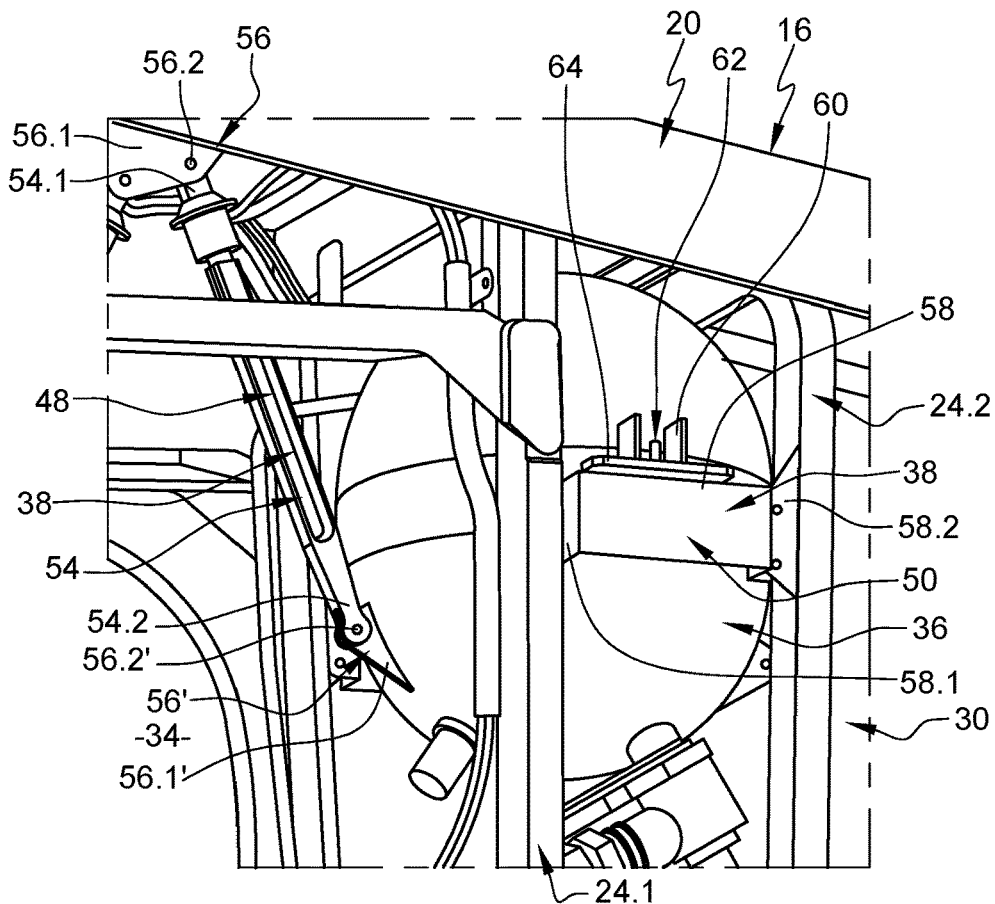
FIG. 4 is a perspective view of part of a primary structure, a tank and a system for attaching the tank, depicting one embodiment of the invention.
Figure 6:
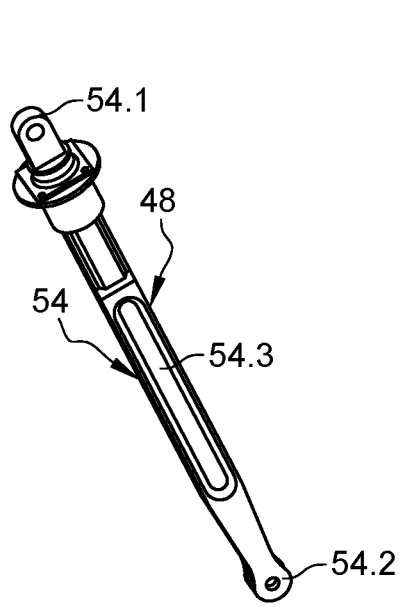
FIG. 6 is a perspective view of a longitudinal attachment, depicting one embodiment of the invention.
Figure 7:
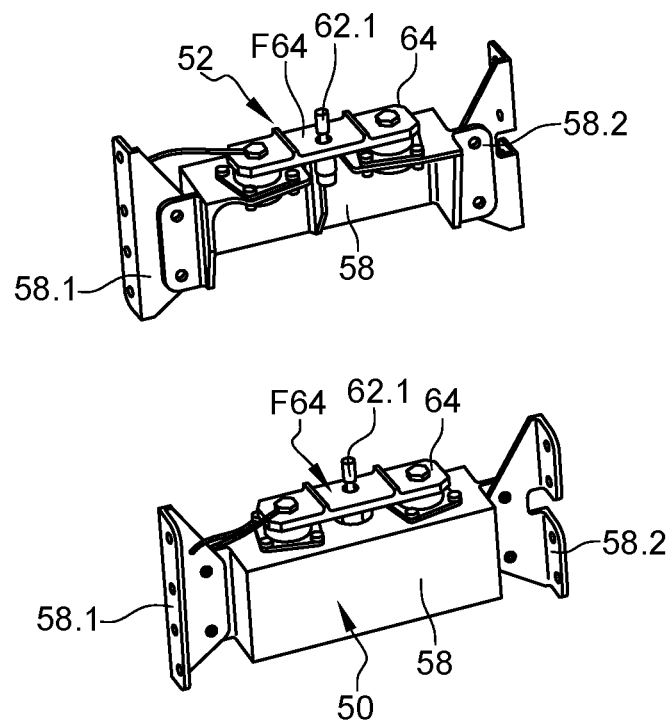
FIG. 7 is a perspective view of two lateral attachments, depicting one embodiment of the invention.
Figure 8:
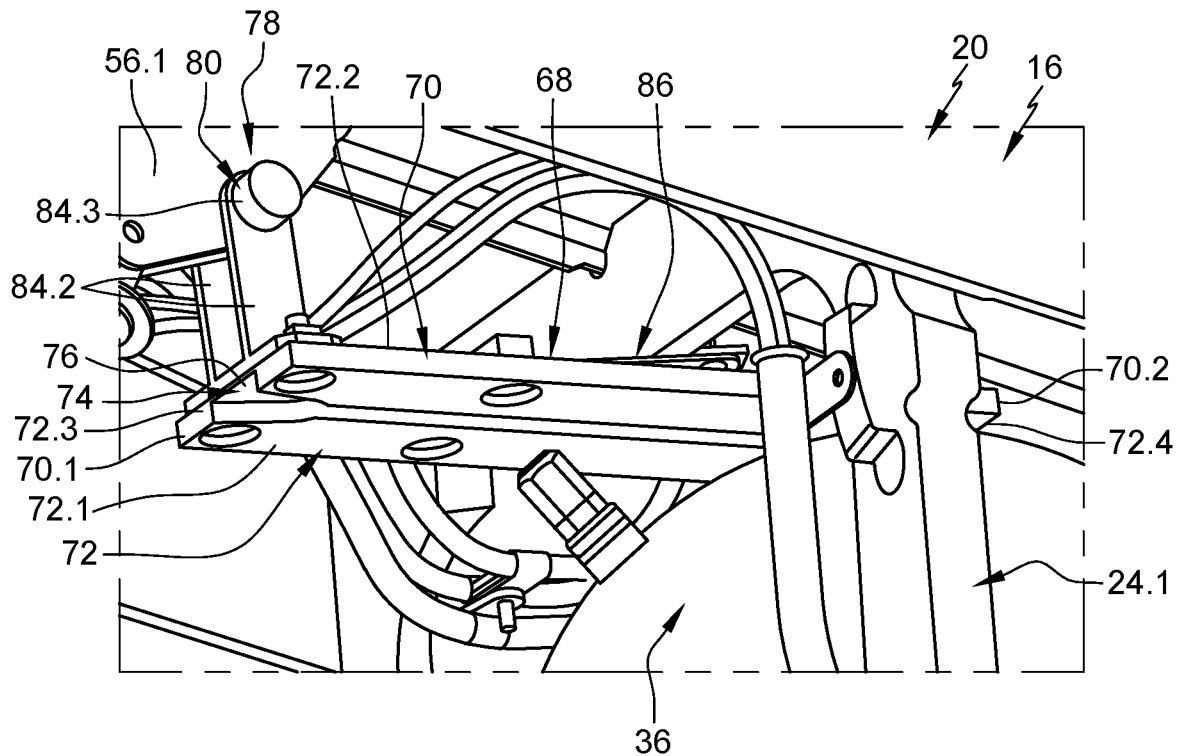
FIG. 8 is a perspective view of the interior of part of a primary structure equipped with a guide rail, depicting one embodiment of the invention.

In a configuration visible in FIGS. 4 and 6, the longitudinal attachment 48 comprises a link 54 having first and second ends 54.1, 54.2, a first connection 56 connecting the first end 54.1 to the upper longitudinal member 20 and a second connection 56' connecting the second end 54.2 to the tank 36. The link 54 also comprises a central part 54.3 connecting the first and second ends 54.1, 54.2.

The first connection 56 comprises at least one first lug 56.1 fastened to the upper longitudinal member 20 positioned in a longitudinal plane above the through-hole 34 and one first transverse pivot axis 56.2 connecting the first end 54.1 of the link 54 and the first lug 56.1 substantially perpendicularly to a longitudinal plane. In one arrangement, the first connection 56 comprises two first lugs 56.1 substantially parallel to each other and to a median longitudinal plane passing through the revolution axis A40 forming a yoke and between which the first end 54.1 of the link 54 is positioned.

The second connection 56' comprises at least one second lug 56.1' fastened to the tank 36, positioned in a longitudinal plane when the tank 36 is in the mounted position and one second transverse pivot pin 56.2' connecting the second end 54.2 of the link 54 and the second lug 56.1', substantially parallel to a longitudinal plane. In one arrangement, the second end 54.2 of the link 54 comprises a yoke with two flanges substantially parallel to each other and to the median longitudinal plane, between which the second end 54.2 of the link 54 is positioned.

In one configuration, the link 54 comprises at least one damping system, for example made of elastomer, connecting the central part 54.3 and the first or second end 54.1, 54.2.

Each of the first and second lateral attachments 50, 52 comprises a base 58 having a first end 58.1 connected by connecting elements to the first rear transverse frame 24.1 and a second end 58.2 connected by connecting elements to the second rear transverse frame 24.2, a lateral lug 60 fastened to the tank 36 and at least one demountable connection 62 connecting the base 58 and the lateral lug 60. In one configuration the lateral lug 60 has a U-shape section, the base of the U being substantially horizontal when the tank 36 is in the mounted position, the branches of the U being offset upward relative to the base of the U.

In one embodiment, the demountable connection 62 comprises a threaded rod 62.1 oriented substantially vertically and connected directly or indirectly to the base 58 and a nut configured to be screwed onto the threaded rod 62.1. Additionally, the lateral lug 60 has a through-orifice through which the threaded rod 62.1 passes. The demountable connection 62 may comprise a braking system to limit the risks of the nut becoming unscrewed.

In one embodiment, at least one of the first and second lateral attachments 50, 52 comprises at least one plate 64 positioned above the base 58, having a substantially horizontal contact face F64 against which the lateral lug 60 fastened to the tank 36 bears, and at least one damping system, made of elastomer for example, connecting the base 58 and the plate 64, the threaded rod 62.1 being connected to the plate 64.

The attachment system 38 described above enables an isostatic connection to be obtained between the tank 36 and the primary structure 16.

Of course, the invention is not limited to this embodiment of the attachment system 38. Other solutions may be envisaged.

To demount the tank 36 the demountable connections 62 of the first and second lateral attachments 50, 52 are unscrewed and the first and/or second pivot pin 56.2, 56.2' is demounted to detach the link 54 from the tank 36 and/or from the upper longitudinal member 20.

To facilitate manipulating it when mounting or demounting it, at least one tank 36 comprises a guide pin 66 positioned on the top part of the tank 36. In one arrangement the guide pin 66 is positioned in line with the revolution axis A40 of the tank 36. The guide pin 66 comprises a head 66.1 and a foot 66.2 connecting the head 66.1 to the tank 36, the head 66.1 having in a plane perpendicular to the revolution axis A40 a larger section than the foot 66.2. In one configuration the guide pin 66 has a revolution axis coinciding with the revolution axis A40 of the tank 36 and a circular shape.

Additionally, mounting/demounting tooling 68 is provided for moving the tank 36 when mounting or demounting it, the mounting/demounting tooling 68 being fastened to the primary structure 16 and positioned above the tank 36. This mounting/demounting tooling 68 is demountably connected to the primary structure 16 and connected to the latter only during mounting or demounting. This solution makes it possible to reduce the onboard weight during operation of the aircraft. Alternatively, the mounting/demounting tooling 68 could be permanently connected to the primary structure 16.

The mounting/demounting tooling 68 comprises at least one guide rail 70 that extends in the longitudinal direction between first and second ends 70.1, 70.2, the guide pin 66 and the guide rail 70 being configured to cooperate with each other so that the guide pin 66 is able to slide between the first and second ends 70.1, 70.2 of the guide rail 70 and the tank 36 is supported by the guide rail 70. In one arrangement the first end 70.1 of the guide rail 70 is situated in the vicinity of or in line with the through-hole 34. To be more specific the first end 70.1 is positioned approximately in the same first transverse plane as the center of the through-hole 34. The second end 70.2 of the guide rail 70 is positioned in the vicinity of the guide pin 66 when the tank 36 is in the mounted position. To be more specific, the second end 70.2 is positioned in a second transverse plane farther from the through-hole 34 than a plane containing the guide pin 66 when the tank 36 is in the mounted position. The guide pin 66 therefore cooperates with the guide rail 70 when the tank 36 is in the mounted position.

As depicted in FIGS. 11 to 14, the guide rail 70 comprises a parallelepipedal body 72 that has a lower face 72.1 oriented toward the tank 36, an upper face 72.2 oriented toward the upper longitudinal member 20, opposite the lower face 72.1, a first end face 72.3 situated at the level of the first end 70.1 of the guide rail 70, and a second end face 72.4 situated at the level of the second end 70.2.

Figure 11:
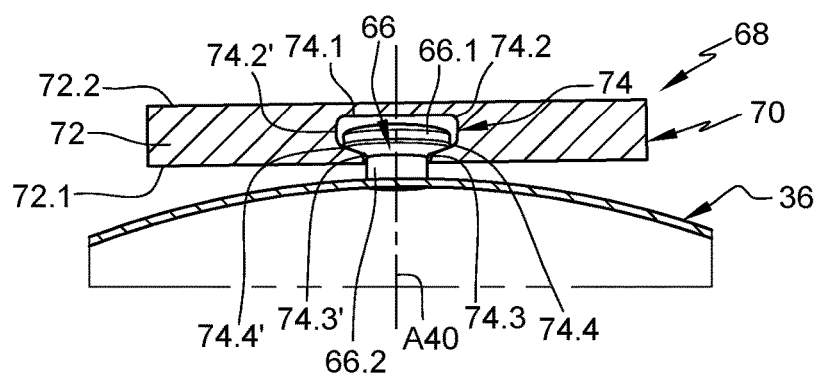
FIG. 11 is a cross section of a rail supporting a tank, depicting one embodiment of the invention.

The guide rail 70 also comprises a substantially rectilinear groove 74 provided in the body 72 and opening onto the lower face 72.1 of the body which has a T-shape cross section configured to accommodate the guide pin 66. As depicted in FIG. 11 the groove 74 has a bottom 74.1 substantially parallel to the lower face 72.1, first left and right lateral faces 74.2, 74.2' extending as far as the bottom, second right and left lateral faces 74.3, 74.3' extending as far as the lower face 72.1, and right and left shoulders 74.4, 74.4' connecting the first and second lateral faces 74.2 with 74.3 and 74.2' with 74.3', respectively. The groove 74 has a first width at the level of the head of the T (corresponding to the distance separating the first right and left lateral faces 74.2, 74.2') greater than the diameter of the head 66.1 of the guide pin 66 and a second width at the level of foot of the T (corresponding to the distance separating the second right and left lateral faces 74.3, 74.3') less than the diameter of the head 66.1 of the guide pin 66 and greater than the diameter of the foot 66.2 of the guide pin 66.

In one arrangement, the guide rail 70 is positioned at the level of the median longitudinal plane and the groove 74 is symmetrical with respect to this median longitudinal plane.

The right and left shoulders 74.4, 74.4' are not necessarily plane. They may be curved like the head 66.1 of the guide pin.

The groove 74 opens onto the first and second end faces 72.3, 72.4 of the body 72 so that the guide pin 66 can be introduced into the groove 74 from either the first or second end 70.1, 70.2 of the guide rail 70.

The first right and left lateral faces 74.2, 74.2' are substantially parallel to each other over virtually all the length of the guide rail 70 (the distance separating the first and second ends 70.1, 70.2 of the guide rail 70). In the same manner, the second right and left lateral faces 74.3, 74.3' are substantially parallel to each other over virtually all the length of the guide rail 70. In one embodiment the groove 74 has an opening section 76 extending as far as the first end face 72.3 at the level of which the groove 74 is flared in the direction of the first end face 72.3. At least the second right and left lateral faces 74.3, 74.3' are therefore flared in the direction of the first end face 72.3 at the level of the opening section 76. In one arrangement, the first right and left lateral faces 74.2, 74.2' are also flared in the direction of the first end face 72.3 at the level of the opening section 76. This solution makes it possible to facilitate the introduction of the guide pin 66 in the groove 74 or its extraction. By way of illustration, to give an order of magnitude, the opening section 76 has a length starting from the first end face 72.3 of the order of 1 to 3 cm. At the level of the first end face 72.3, the groove 74 has a width equal to approximately three times the width of the groove outside the opening section 76.

The guide rail 70 is connected to the primary structure 16 by a connecting system 78 visible in FIGS. 9, 12, 13 and 15 configured to enable at least the second end 70.2 of the guide rail 70 to be moved in the vertical direction with an amplitude of the order of a few millimeters to 1 to 2 centimeters.

In one embodiment, the connecting system 78 comprises a first pivoting connection 80 situated in the vicinity of the first end 70.1 of the guide rail 70 connecting the latter to the primary structure 16, more specifically to the upper longitudinal member 20 of the primary structure 16, and an elastically deformable second connection 82 offset toward the second end 70.2 of the guide rail 70 relative to its first end and connecting the latter to the primary structure 16, to be more specific to the upper longitudinal member 20 of the primary structure 16.

In one configuration, the first connection 80 comprises at least one first lug 84.1 fastened to the upper longitudinal member 20 and positioned in a longitudinal plane, at least one second lug 84.2 fastened to the guide rail 70, to be more specific connected to the upper face 74.2 of the guide rail 70 and positioned in a longitudinal plane, and a horizontal pivot pin 84.3 perpendicular to the longitudinal direction, passing through the first and second lugs 84.1, 84.2 and enabling them to pivot relative to each other. In one arrangement the first connection 80 comprises two parallel second lugs 84.2 through which the pivot pin 84.3 passes and between which the first lug 84.1 fastened to the upper longitudinal member 20 is positioned. In one embodiment, the first lug 84.1 of the first connection 80 connecting the guide rail 70 to the primary structure 16 and the first lug 56.1 of the first connection 56 connecting the link 54 to the primary structure 16 are one and the same. The guide rail 70 may therefore be put into place after demounting the link 54.

In one embodiment, the second connection 82 comprises a leaf spring 86 that has a first end 86.1 connected to the guide rail 70 and a second end 86.2 offset in the longitudinal direction relative to the first end 86.1 and connected to the primary structure 16. This leaf spring 86 enables an operative to be able to place the tank 36 vertically with less effort.

In one arrangement, the first end 86.1 of the leaf spring 86 is oriented toward the first end 70.1 of the guide rail 70 and the second end 86.2 of the leaf spring 86 is oriented toward the second end 70.2 of the guide rail 70. In one non-limiting embodiment, to give an order of magnitude, the leaf spring 86 has a length (the distance separating its first and second ends 86.1, 86.2) between one quarter and one half inclusive of the length of the guide rail 70.

The first end of the leaf spring 86 is closer to the first end 70.1 of the guide rail 70 than its second end 70.2. In one non-limiting embodiment, to give an order of magnitude, the first ends 86.1, 70.1 of the leaf spring 86 and of the guide rail 70 are separated by a distance between one third and half inclusive of the length of the guide rail 70.

In one configuration, the leaf spring 86 has a width substantially equal to that of the body 72 of the guide rail 70.

The first end 86.1 of the leaf spring 86 is pressed against the upper face 72.2 of the body 72 of the guide rail 70 and connected to the latter by at least one connecting element 88, such as bolts or rivets, for example.

In one embodiment, the second connection 82 comprises at least one hook 90 fastened to the second end 86.2 of the leaf spring 86 and configured to be hooked onto a transverse frame, in particular the first rear or front transverse frame 24.1, 24.3.

To this end, the front or rear transverse frame 24.1, 24.3 has a core 92.1 positioned in a transverse plane and a rim 92.2 positioned at one end of the core 92.1, projecting relative to the latter and oriented in the direction away from the through-hole 34.

Figure 9:
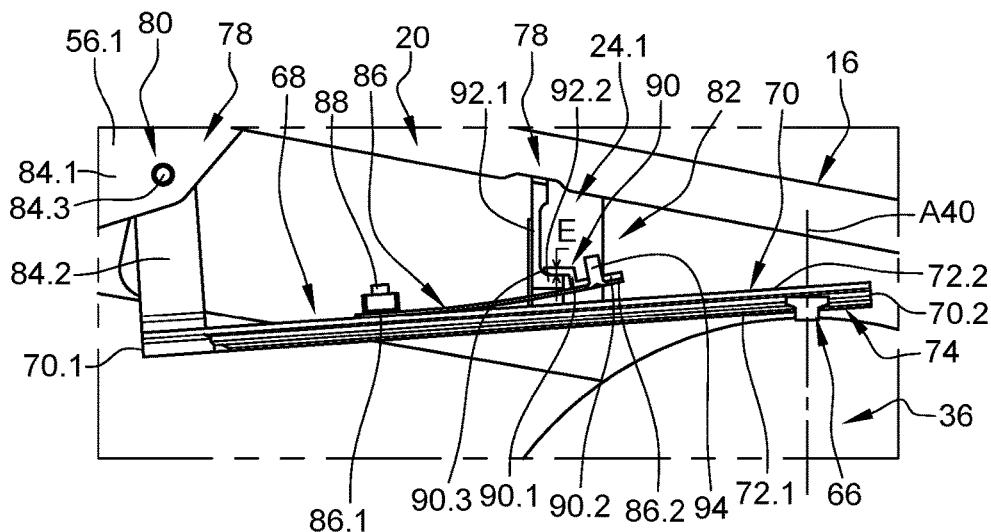
FIG. 9 is a schematic representation of part of a primary structure equipped with a guide rail supporting a tank positioned at one end of the guide rail, depicting one embodiment of the invention.
Figure 13:
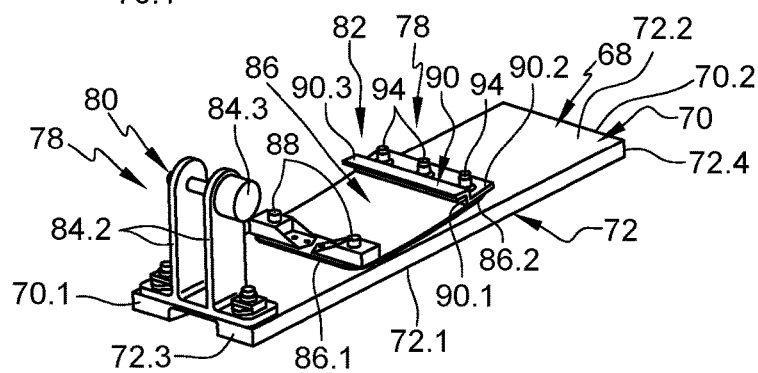
FIG. 13 is a perspective view as seen from a first angle of a guide rail, depicting a second embodiment of the invention.
Figure 15:
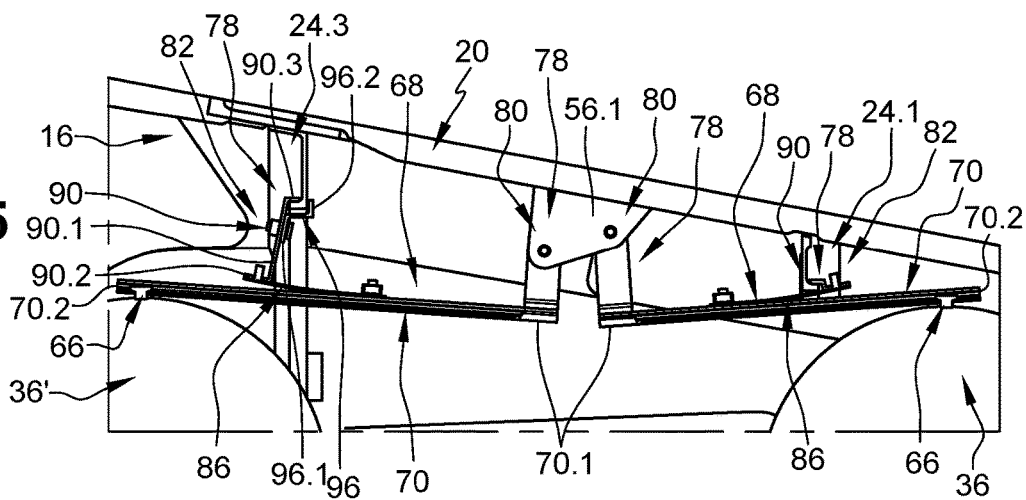
FIG. 15 is a schematic representation of the interior of a primary structure equipped with two guide rails, depicting one embodiment of the invention.

In a first embodiment visible in FIGS. 9, 13 and 15, the second connection 82 comprises a hook 90 with a Z-shape profile having a core 90.1 and first and second flanges 90.2, 90.3 positioned at respective opposite ends of the core 90.1, substantially perpendicular to the core 90.1 and oriented in opposite directions. The first flange 90.2 is pressed against the leaf spring 86 and connected to the latter by connecting elements 94 such as bolts or rivets for example. The second flange 90.3 is oriented in the direction of the through-hole 34 and configured to cooperate with the rim 92.2 of the transverse frame. The first and second flanges 90.2, 90.3 are spaced by a distance substantially equal to the thickness E of the rim 92.2 of the rear or front transverse frame 24.1, 24.3.

In a second embodiment visible in FIGS. 13 and 15, the second connection 82 comprises a hook 90 with a Z-shape profile. The distance between the first and second flanges 90.2, 90.3 of the hook 90 of the second embodiment is much greater than that between the first and second flanges 90.2, 90.3 of the hook 90 of the first embodiment.

In this second embodiment the second connection 82 comprises at least one system 96 for holding the hook 90 hooked onto the rear or front transverse frame 24.1, 24.3. In one configuration this retaining system 96 has a Z-shape profile with a first flange 96.1 connected to the core 90.1 of the hook 90 and a second flange 96.2 spaced from the second flange 90.3 of the hook.

Figure 12:
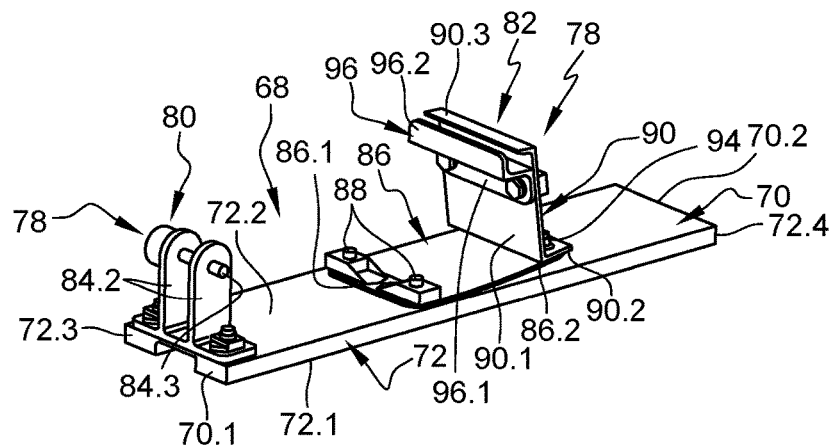
FIG. 12 is a perspective view as seen from a first angle of a guide rail, depicting a first embodiment of the invention.

In a configuration visible in FIG. 15, a second connection 82 configured like that visible in FIG. 13 is used to support the guide rail 70 to which the first tank 36 is connected, offset toward the rear relative to the through-hole 34, and a second connection 82 configured like that visible in FIG. 12 is used to support the guide rail to which the second tank 36' is connected, offset toward the front relative to the through-hole 34.

Of course, the invention is not limited to this configuration for the retaining system 96. The hook 90 and the retaining system 96 are therefore configured to enable the hook 90 to be hooked onto the corresponding transverse frame 24.1, 24.3 while preventing the hook 90 from being detached from said transverse frame 24.1, 24.3 because of a movement in horizontal translation from front to rear of the guide rail 70 relative to the primary structure 16. Moreover, the second connection 82, the leaf spring 86 and the hook 90 are configured as a function of the distance separating the tank 36, 36' from the upper longitudinal member 20. The leaf spring 86 is configured to take some of the weight of the tank 36, 36' when it is manipulated.

In one embodiment, the guide rail 70 may be inclined in the direction of its first end 70.1 in order to facilitate sliding the tank in the direction of the first end 70.1.

Of course, the invention is not limited to this embodiment. The guide rail 70 is therefore not necessarily rectilinear and oriented in the longitudinal direction. It may have a rectilinear first section parallel to the longitudinal direction, in particular between the first and second (front or rear) transverse frames, and a second section connected to the first section and oriented toward the through-hole 34 which may be rectilinear or curved.

Regardless of the embodiment, the pylon is equipped at least during mounting or demounting the tank 36 with at least one guide system configured to move the tank 36 from its mounted position toward the through-hole 34, said guide system including at least one guide pin 66 fastened to the tank 36, a guide rail 70 positioned above the tank 36 and extending between first and second ends 70.1, 70.2, and a connecting system 78 connecting the guide rail 70 and the primary structure 16. The guide pin 66 and the guide rail 70 are configured to cooperate with each other so that the guide pin 66 is able to slide along the guide rail 70 between the first and second ends 70.1, 70.2 of the guide rail 70 and the tank 36 is supported by the guide rail 70.

A demounting method is described with reference to the various figures. This method comprises a step of detaching the tank 36 from the primary structure 16. This detachment step comprises a phase of withdrawal of the first pivot pin 56.2 in order to detach the longitudinal attachment 48 from the primary structure 16. The second pivot pin 56.2' may also be withdrawn in order to detach the longitudinal attachment 48 from the tank 36.

This detachment step also comprises, for each lateral attachment 50, 52, a phase of unscrewing the nut of the demountable connection 62 and disconnecting the connecting system 44 from the tank 36.

Following on from this, the method comprises a step of mounting the guide rail 70 aimed at having the guide pin 66 cooperate with the guide rail 70 and connecting the guide rail 70 to the primary structure 16. The phase of unscrewing the nut of the demountable connection 62 from the lateral attachments 50, 52 may be carried out before or after the step of mounting the guide rail 70.

During the step of mounting the guide rail 70, the guide pin 66 is introduced into the groove 74 of the guide rail 70 from its second end 70.2, the hook 90 is hooked onto the first front or rear transverse frame 24.1, 24.3, and the first connection 80 is then put into place to connect the first end 70.1 of the guide rail 70 to the primary structure 16.

After the step of mounting the guide rail 70, the method comprises a step of lifting and pivoting the tank 36 to disengage the lateral lugs 60 of the tank 36 from the threaded rods 62.1 of the demountable connections 62 for the two lateral attachments 50, 52. This step of lifting and pivoting the tank 36 is facilitated by the leaf spring 86 and the guide rail 70, which compensate some of the weight of the tank 36. Moreover, the guide pin 66 having a circular shape, the tank 36 is able to pivot on itself on being engaged in the groove 74. Pivoting through an angle on the order of 35° enables the lateral lugs 60 to be offset from the tank 36 so that they do not interfere with the transverse frames of the primary structure 16.

Following on from this, the method comprises a step of sliding the tank 36 along the guide rail 70 in the direction of the first end 70.1 of the latter, the tank 36 being suspended from the guide rail 70 by means of the guide pin 66. As before, the leaf spring 86 and the guide rail 70 take most of the weight of the tank 36.

Figure 10:
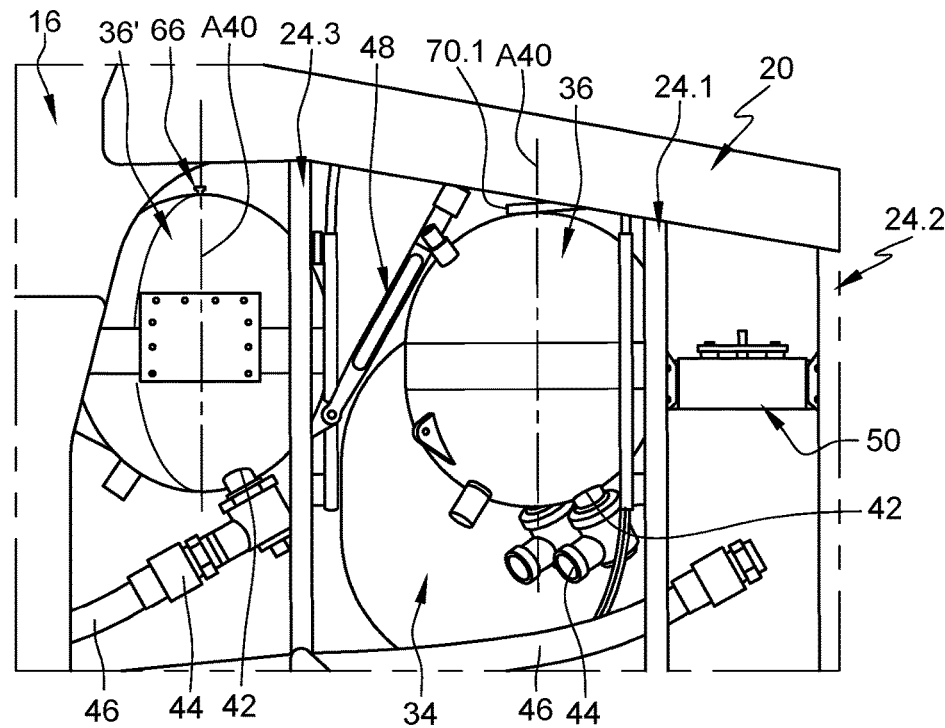
FIG. 10 is a schematic representation of part of a primary structure equipped with a guide rail supporting a tank positioned at another end of the guide rail, depicting one embodiment of the invention.
Figure 14:
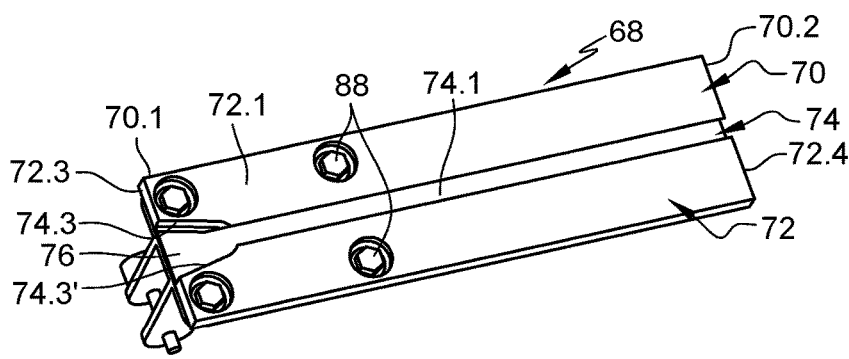
FIG. 14 is a perspective view as seen from a second angle of a guide rail, depicting one embodiment of the invention.

As depicted in FIG. 10, the method comprises a step of unfastening the guide pin 66 and the guide rail 70 when the tank 36 arrives at the level of the first end 70.1 of the guide rail 70, during which the guide pin 66 is extracted from the groove 74. The fact that the groove 74 has a flared shape, as depicted in FIG. 14, facilitates this step. Finally, the demounting method comprises a step of manipulation of the tank 36 to cause it to pass through the through-hole 34. To this end, the tank 36 may be pivoted with its revolution axis A40 horizontal to cause it to pass through the through-hole 34.

A mounting method comprises the same steps as the demounting method, but in the reverse order. The method therefore comprises a step of manipulation of the tank 36 to cause it to pass through the through-hole 34 so as to position it in the interior zone of the primary structure 16, a step of suspending the tank 36 from the guide rail 70 by causing the guide pin 66 and the guide rail 70 to cooperate, a step of sliding the tank 36 along the guide rail 70 in the direction of the second end 70.2 of the latter, a step of positioning the tank 36 relative to the attachment system 38, a step of demounting the guide rail 70, and a step of fastening the tank 36 to the primary structure 16 of the pylon.

The guide pin 66 and the guide rail 70 contribute to simplifying the manipulation of the tank 36 when mounting or demounting it by at least partly compensating its weight and by assuring precise guiding of the tank in the longitudinal direction during its transfer in the direction of the through-hole 34. Moreover, the guide pin 66 and the guide rail 70 also enable safe passage of the tank 36 in zones where the clearances from the surround elements, such as the transverse frames 24.1 to 24.4, are small.

The guide rail 70 also makes it possible to limit the risks of the tank 36 falling onto the pipework installed below the tank when mounting or demounting it.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft pylon comprising:
a box-section primary structure including at least one lateral wall which delimits an interior zone and an exterior zone and includes at least one through-hole enabling the interior and exterior zones to communicate,
at least one tank occupying in the interior zone of the primary structure a mounted position offset in a longitudinal direction parallel to the lateral wall relative to the through-hole,
at least one attachment system demountably connecting the tank and the primary structure,
wherein the aircraft pylon is equipped, at least when mounting or demounting the tank, with at least one guide system configured to move the tank from its mounted position toward the through-hole, said guide system including at least one guide pin fastened to the tank, one guide rail positioned above the tank that extends in the longitudinal direction between first and second ends, and a connecting system connecting the guide rail and the primary structure, the first end of the guide rail being situated in a vicinity of or in line with the through-hole, the second end being offset from the through-hole, the guide pin and the guide rail being configured to cooperate with each other so that the tank is supported by the guide rail and able to slide along the guide rail.

2. The aircraft pylon as claimed in claim 1, wherein the connecting system is configured to allow at least the second end of the guide rail to be moved in a vertical direction.

3. The aircraft pylon as claimed in claim 2, wherein the connecting system comprises:
a pivoting first connection situated in a vicinity of the first end of the guide rail, connecting the guide rail to the primary structure and including a horizontal pivot pin perpendicular to the longitudinal direction,
an elastically deformable second connection offset toward the second end of the guide rail relative to its first end and connecting the guide rail and the primary structure.

4. The aircraft pylon as claimed in claim 3, wherein the second connection comprises a leaf spring that has a first end connected to the guide rail and a second end offset in the longitudinal direction relative to the first end and connected to the primary structure.

5. The aircraft pylon as claimed in claim 4, wherein the first end of the leaf spring is oriented toward the first end of the guide rail and the second end of the leaf spring is oriented toward the second end of the guide rail, the first end of the leaf spring being closer to the first end of the guide rail than its second end.

6. The aircraft pylon as claimed in claim 5,
wherein the first end of the leaf spring is pressed against the guide rail and is connected to the guide rail by at least one connecting element, and
wherein the second connection comprises at least one hook fastened to the second end of the leaf spring configured to be hooked onto the primary structure.

7. The aircraft pylon as claimed in claim 6,
wherein the primary structure of the aircraft pylon comprises transverse frames, one of the transverse frames having a core positioned in a transverse plane and a rim projecting relative to the core and oriented in a direction away from the through-hole, and
wherein the hook has a Z-shape profile and comprises a flange oriented in the direction of the through-hole configured to cooperate with the rim of the transverse frame.

8. The aircraft pylon as claimed in claim 7, wherein the second connection comprises at least one system for keeping the hook hooked onto the transverse frame.

9. The aircraft pylon as claimed in claim 1, wherein the guide pin has a revolution axis and comprises a head and a foot connecting the head to the tank, the head having a larger section than the foot.

10. The aircraft pylon as claimed in claim 9, wherein the tank has a revolution axis, the revolution axes of the guide pin and the tank coinciding.

11. The aircraft pylon as claimed in claim 1, wherein the guide rail comprises:
- a body that has a lower face oriented toward the tank, a first end face situated at a level of the first end of the guide rail and a second end face situated at a level of the second end of the guide rail,
- a groove provided in the body opening onto the lower face of the body that has a T-shape cross section configured to accommodate the guide pin.

12. The aircraft pylon as claimed in claim 11, wherein the groove opens onto the first and second end faces of the body.

13. The aircraft pylon as claimed in claim 12, wherein the first end of the guide rail being situated in a vicinity of or in line with the through-hole, the groove has an opening section extending as far as the first end face at a level of which the groove is flared in a direction of the first end face.

14. A method of demounting a tank positioned in an aircraft pylon as claimed in claim 1, wherein the demounting method comprises:
- unfastening the tank from the primary structure of the pylon,
- mounting the guide rail to cause the guide pin to cooperate with the guide rail and to connect the guide rail to the primary structure,
- sliding the tank along the guide rail in a direction of the first end of the latter, the tank being suspended from the guide rail,
- unfastening the guide pin and the guide rail,
- manipulating the tank to cause the tank to pass through the through-hole.

15. The method as claimed in claim 14, wherein the method comprises lifting and pivoting the tank before sliding the tank along the guide rail.

16. A method of mounting a tank positioned in an aircraft pylon as claimed in claim 1, wherein the mounting method comprises:
- manipulating the tank to cause the tank to pass through the through-hole to position the tank in the interior zone of the primary structure,
- suspending the tank from the guide rail by causing the guide pin and the guide rail to cooperate,
- sliding the tank along the guide rail in a direction of the second end of the latter,
- positioning the tank relative to the attachment system,
- demounting the guide rail,
- fastening the tank to the primary structure of the pylon.

* * * * *